US008263865B2

(12) United States Patent
Takayama

(10) Patent No.: US 8,263,865 B2
(45) Date of Patent: Sep. 11, 2012

(54) WIRE CONNECTION UNIT

(75) Inventor: Tsutomu Takayama, Makinohara (JP)

(73) Assignee: Yazaki Corporation, Tokyo (JP)

(*) Notice: Subject to any disclaimer, the term of this patent is extended or adjusted under 35 U.S.C. 154(b) by 273 days.

(21) Appl. No.: 12/648,398

(22) Filed: Dec. 29, 2009

(65) Prior Publication Data

US 2010/0175906 A1 Jul. 15, 2010

(30) Foreign Application Priority Data

Jan. 13, 2009 (JP) ................................. 2009-005058

(51) Int. Cl.
*H02G 15/113* (2006.01)

(52) U.S. Cl. ........................................................ 174/92

(58) Field of Classification Search ..................... 174/92
See application file for complete search history.

(56) References Cited

U.S. PATENT DOCUMENTS 1,620,693 A * 3/1927 Royal ............................ 174/92
3,634,605 A * 1/1972 Dola .......................... 174/88 R
3,691,505 A * 9/1972 Graves .......................... 338/214
5,410,105 A * 4/1995 Tahara et al. .................. 174/92
5,594,213 A * 1/1997 Skopic ............................ 174/91
5,606,150 A * 2/1997 Radliff et al. .................. 174/92
6,376,774 B1 * 4/2002 Oh et al. ......................... 174/92
2007/0072455 A1 3/2007 Onuma
2008/0254664 A1 * 10/2008 Hiner et al. .................. 439/283

FOREIGN PATENT DOCUMENTS

JP 2007-103182 A 4/2007

* cited by examiner

*Primary Examiner* — Chau Nguyen

(74) *Attorney, Agent, or Firm* — Sughrue Mion, PLLC

(57) ABSTRACT

A wire connection unit includes a connector, a first case, and a second case. The connector electrically connects a first wire and a second wire. The second case is joined with the first case, and has an inner face opposing the first case. The inner face is formed with a groove and a concave portion. The groove holds the first wire and the second wire. The concave portion is disposed at the groove and accommodates the connector. A projection is provided in the groove. The projection protrudes toward the first case from a bottom of the groove.

6 Claims, 6 Drawing Sheets

WIRE CONNECTION UNIT

BACKGROUND

The present invention relates to a wire connection unit and more particularly to a wire connection unit which accommodates a metallic connector for connecting together ends of two wires including a shielded wire.

In recent years, many coaxial cables (hereinafter, referred to as shielded wires) are used as antenna cables in audio equipment installed on vehicles. For such a shielded wire to be connected with a general wire while being earthed in an intermediate position along the length thereof, in many cases, a core wire of the shielded wire and a core wire of the general wire are clamped together by a metallic connector, and a metal piece which extends from a metallic wire device called an earth plate is clamped to a braided wire which surrounds concentrically the core wire of the shielded wire, so that the braided wire is earthed. In the connecting construction described above, an area which includes the metallic connector which connects the core wires together and a distal end side of the braided wire is covered with an insulating heat-shrinkable tube, whereby a short circuit between the metallic connector and the earth plate is prevented (refer to Patent Document 1).

[Patent Document 1] Japanese Patent Publication No. 2007-103182

In the connecting construction of Patent Document 1, metallic pieces extending from an earth plate are clamped to a covered portion of a shielded wire and a covered portion of a general wire, respectively. Because of this, even though a force is exerted in a direction in which one of the wires is separated from the other, both the wires are allowed to be kept in contact with each other. According to this construction, since a step is required of clamping the metallic pieces extending from the earth plate to the respective covered portions of the wires, the assembling work load is increased. In addition, since the metallic pieces that are to be clamped to the covered portions of the wires have to be provided at edge portions of the earth plate, the shape of the earth plate becomes complex.

SUMMARY

It is therefore one advantageous aspect of the present invention to provide a wire connection unit which can protect a connecting portion between wires by a construction which makes it difficult for the wires to be disengaged from each other and which can facilitate the assembling work of the wires.

According to one aspect of the invention, there is provided a wire connection unit, including:

a connector, electrically connecting a first wire and a second wire;

a first case; and a second case, joined with the first case, and having an inner face opposing the first case, the inner face formed with:

a groove, adapted to hold the first wire and the second wire; and a concave portion, disposed at the groove, and accommodating the connector, wherein a projection protruding toward the first case from a bottom of the groove is provided in the groove.

The wire connection unit may be configured such that the first wire is a shielded wire in which a core wire is shielded concentrically therearound by a braided wire.

The wire connection unit may be configured such that the groove is adapted to accommodate an earth wire and an earth connector, the earth connector electrically connecting the earth wire to the braided wire of the shielded wire.

The wire connection unit may be configured such that the projection and other projections are arranged along an extending direction of the groove at an interval, the other projections protruding toward the first case from a bottom of the groove.

The wire connection unit may be configured such that the first case has a same shape as the second case.

The wire connection unit may be configured such that the first case is connected to the second case by an elastic hinge.

According to another aspect of the invention, there is provided a wire connection unit, including:

a connector, electrically connecting a first wire and a second wire;

a first case, having a first face; and a second case, having a second face opposing the first face, and joined with the first case;

wherein the first face and the second face form a wire path including, a first part accommodating the first wire, a second part accommodating the second wire, and a connection part disposed between the first part and the second part and accommodating the connector, and wherein the first part and the second part are bent respectively.

The wire connection unit may be configured such that the first wire is a shielded wire in which a core wire is shielded concentrically therearound by a braided wire.

The wire connection unit may be configured such that the wire path is adapted to accommodate an earth wire and an earth connector, the earth connector electrically connecting the earth wire to the braided wire of the shielded wire.

The wire connection unit may be configured such that the first part and the second part are bent into a meandering shape respectively.

The wire connection unit may be configured such that the first part and the second part are bent into a crank shape respectively.

DETAILED DESCRIPTION OF EXEMPLIFIED EMBODIMENTS (First Embodiment)

Hereinafter, an embodiment to which the invention is applied will be described by reference to the drawings.

In this embodiment, although a wire connection unit will be described which accommodates a connecting portion between a shielded wire and a general wire, the invention is not limited to this example. For example, the wire connection unit of the embodiment can also be applied to a case in which two shielded wires are connected together.

The shield wire is a coaxial cable which is connected to an antenna installed on a vehicle and is, made up of a core wire, an insulation layer which covers the core wire concentrically, a braided wire which is made up of a conductor which covers the insulation layer concentrically and a covering portion of a synthetic resin which covers the braided wire. The general wire (the non-shielded wire) and the earth wire are a wire which is made up of a core wire into which a plurality of metallic threads of copper, aluminum or the like are bundled up and a covering portion of a synthetic resin which covers the core wire. Here, the covering portions of the respective wires are all formed of an elastic material such as a rubber.

Figure 1:
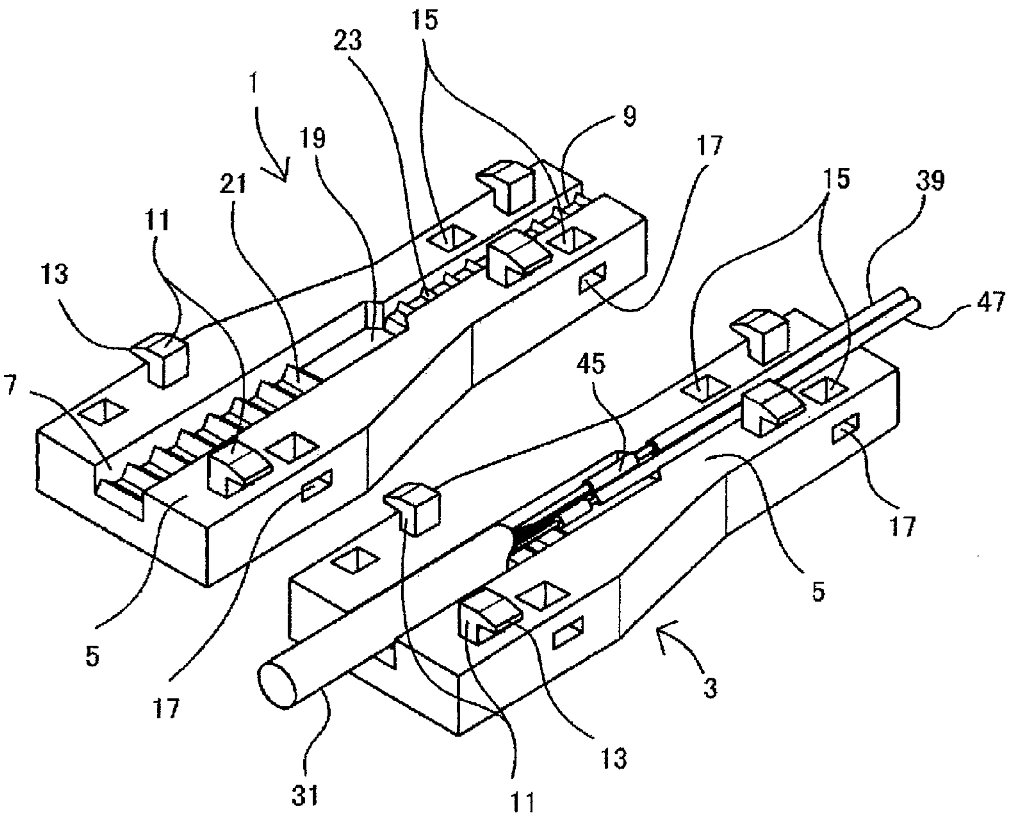
FIG. 1 is a perspective view showing a wire connection unit, which is opened up, according to a first embodiment of the invention.
Figure 2:
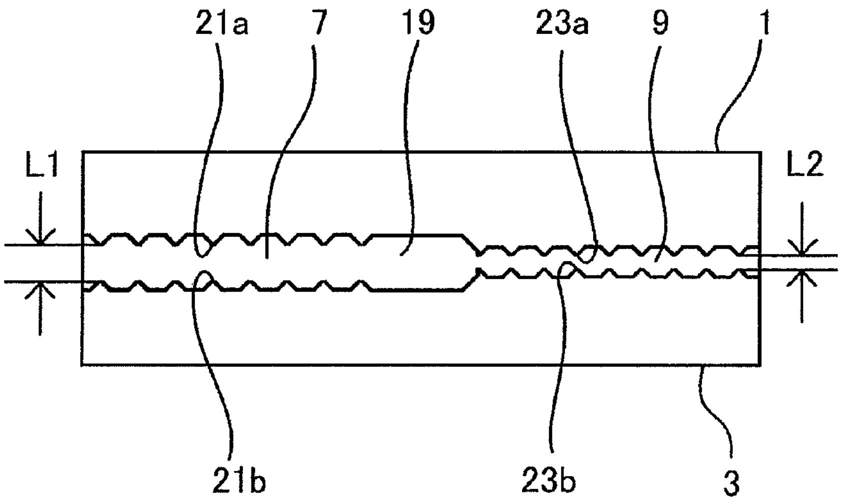
FIG. 2 is a sectional view of the wire connection unit according to the first embodiment of the invention with upper and lower cases joined together.

As is shown in FIGS. 1 and 2, a wire connection unit of this embodiment is formed by joining together an upper case and a lower case which have the same shape and which are made from a resin. A shielded wire groove 7 in which a shielded wire is laid out and a general wire groove 9 in which a general wire and an earth wire are laid out are formed on a mating face (hereinafter, referred to as an inner face) 5 of each of the cases. The shielded wire groove 7 and the general wire groove 9 are formed into a continuous straight line so that longitudinal groove center lines of the grooves coincide with each other and are provided so as to extend between side faces of each of the cases which face each other in a longitudinal direction (a left-right direction in FIG. 2).

Four locking claws 11 are provided on the inner face of each of the cases so as to be erected therefrom, and hooks 13 are formed at distal end portions of the locking claws 11 so as to projects in a direction which is substantially at right angles (outwards relative) to the direction in which the locking claws 11 are erected. Four locking grooves 15 are formed on the inner face of each of the cases. Through holes 17 (FIG. 1) are provided individually in the locking grooves 15 so as to open to both side faces of each of the cases which are opposite each other in a shorter side direction orthogonal to the longitudinal direction. When the locking claws 11 are fitted in the locking grooves 15, the hooks 13 are designed to fit in the through holes 17 for engagement therewith.

The locking claws 11 and locking grooves 15 are provided alternately along the longitudinal direction of each of the cases in a right-hand half portion and a left-hand half portion which are divided by the shielded wire groove 7 and the general wire groove 9, and the locking claws 11 and the locking grooves 15 are disposed so as to intersect each other between the right-hand half portion and the left-hand half portion. By adopting this configuration, when the upper case 1 and the lower case 3 are joined together, the four locking claws 11 formed on the inner face of the upper case 1 are fitted in the corresponding locking grooves 15 on the lower case 3, while the four locking claws 11 formed on the inner face of the lower case 3 are fitted in the corresponding locking grooves 15 on the upper case 1. Then, by the locking claws 11 fitting in the corresponding locking grooves 15 in the way described above, a closure of the upper case 1 and the lower case 3 is held.

A depth of the shielded wire groove 7 is set deeper than a depth of the general wire groove 9. This is because an outside diameter of the shielded wire differs from that of the general wire groove. Consequently, a width of the shielded wire groove 7 is set larger than a width of the general wire groove 9. Here, the depth of the groove denotes a maximum depth at a bottom of the groove with respect to the inner face 5.

A metallic connector accommodation groove 19 is provided at a boundary portion where the shielded wire groove 7 meets the general wire groove 9, and this metallic connector accommodation groove 19 has a depth which is equal to the depth of the shielded wire groove 7 and a width which is equal to the width of the shielded wire groove 7. A metallic connector (which will be described later) is to be accommodated in the metallic connector accommodation groove 19, which metallic connector is adapted to connect the shielded wire with the general wire. The depth and width of the metallic connector accommodation groove 19 can be set as required in accordance with a size of a metallic connector to be used.

A plurality of projecting portions 21, 23, which each have a substantially triangular cross section, are provided, respectively, on bottoms of the shielded wire groove 7 and the general wire groove 9 at predetermined intervals along the longitudinal direction so as to project towards the inner face 5 side. In this embodiment, since the upper case 1 and the lower case 3 have the same shape, the projecting portions 21 are arranged so that distal ends of projecting portions 21*a* of the upper case 1 confront distal ends of projecting portions 21*b* on the lower case 3 in a longitudinal direction. Here, a distance L1 (FIG. 2) between the confronting projecting portions 21 of the shielded wire grooves 7 is set to be smaller than an outside diameter of the shielded wire. Similarly, a distance L2 between the confronting projecting portions 23 of the general wire grooves 9 is set to be smaller than respective outside diameters of the general wire and the earth wire.

Figure 3:
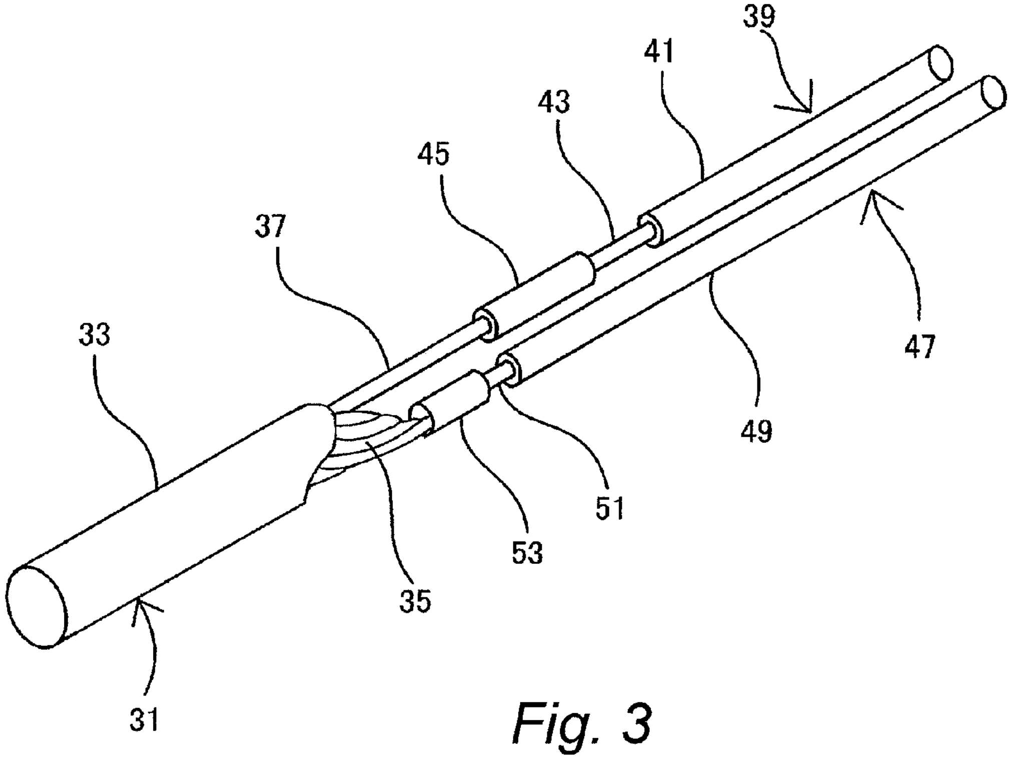
FIG. 3 is a drawing showing a connection of two wires which are accommodated in the wire connection unit according to the first embodiment of the invention.

In a shielded wire 31 that is assembled into the wire connection unit that is configured in the way described above, as is shown in FIG. 3, a covering portion 33 at an end portion thereof is stripped off, and a braided wire 35 and a core wire 37 are exposed from a distal end portion thereof. Although not shown, an insulation layer is provided between the braided wire 35 and the core wire 37. On the other hand, in a general wire 39, a covering portion is stripped off at an end portion thereof, and a core wire 43 is exposed from a distal end portion thereof. Then, the core wire 37 of the shielded wire 31 and the core wire 43 of the general wire 39 are connected together by a joint terminal 45 which constitutes a metallic connector.

The joint terminal 45 is an open barrel terminal, for example, which is made up of a metallic member, and the core wire 37 and the core wire 39 are clamped together by the joint terminal 45 in such a state that the core wire 37 and the core wire 39 are joined through butt joint. The joint terminal 45 can be made up of a hollow cylindrical sleeve, an insulation tube and the like and various members can be used to make up the joint terminal 45, provided that they can connect electrically the core wire 37 and the core wire 39 together.

The end portion of the shielded wire 31 is made into an integral portion by twisting the braided wire 35. On the other hand, in an earth wire 47, similar to the general wire 39, a covering portion 49 is stripped off at an end portion so that a core wire 51 is exposed. This exposed core wire 51 and an end portion of the braided wire 31 which is twisted into the integral portion are electrically connected together by a metallic connector 53 such as a joint terminal.

The general wire 39 and the earth wire 47 are accommodated side by side in the general wire groove 9. By adopting this configuration, when earthing the braided wire 35 of the shielded wire 31, since the earth wire 47 can also be pressed against by the projecting portions 21, 23 as the shielded wire and the general wire 39 are done, the earth wire can be held within the upper case 1 and lower case 3.

Here, the joint terminal 45 and the metallic connector 53 are disposed so that they are deviated from each other in a direction in which the wires extend, whereby for example, a short circuit between the joint terminal 45 and the metallic connector 53 can be prevented. In order to prevent such a short circuit more certainly, for example, the joint terminal 45 and the core wires 37, 43 may be covered with a heat-shrinkable tube or the like.

Next, operations occurring when the wires are assembled into the wire connection unit of the embodiment will be described. As is shown in FIG. 1, in the lower case 3, the shielded wire 31 is disposed in the shielded wire groove 7, and the general wire 39 and the earth wire 47 are disposed in the general wire groove 9. In this state, the joint terminal 45 is disposed in the metallic connector accommodation groove 19. As this occurs, the metallic connector 53 may be disposed either in the shielded wire groove 7 or in the metallic connector accommodation groove 19. When the metallic connector 53 is disposed in the shielded wire groove 7, an outside diameter of the metallic connector 53 is formed smaller than L1, whereby a contact between the metallic connector 53 and the projecting portions 21 can be prevented when the upper and lower cases are joined together.

In such a state that the shielded wire 31, the general wire 39 and the earth wire 47 are laid out in the corresponding wire grooves in the way described above, the four locking claws 11 on the upper case 1 are pushed into the corresponding locking grooves on the lower case 3. When the locking claws 11 are inserted into the locking grooves 15, the hooks 13 on the locking claws 11 are each elastically deformed to a back side thereof, and when the locking claws 11 have reached deepest positions, the hooks 13 are fitted in the corresponding through holes 17 for engagement therewith by virtue of the restoring force thereof, whereby the upper case 1 and the lower case 3 are held together with the inner faces thereof kept in abutment with each other.

Next, when the inner faces of the upper and lower cases are brought into abutment with each other, since the covering portions of the shielded wire 31, the general wire 39 and the earth wire 47 which all constitute peripheries thereof have elasticity, the covering portion 33 of the shielded wire 31 is pressed to be deformed by distal end portions of the projecting portions 21, and the covering portions 41, 49 of the general wire 39 and the earth wire 47 are pressed to be deformed by distal end portions of the projecting portions 23. This allows the shielded wire 31, the general wire 39 and the earth wire 47 to be held within the upper and lower cases, and even though a force is exerted in a direction in which the wires are disengaged from each other, the wires can be kept in contact with each other. In addition, according to this embodiment, since the upper case 1 and the lower case 3 have the same shape, the number of constituent components can be reduced. Further, according to the embodiment, since the necessity of a clamping step of holding the wires is obviated, the assembling work of the wires can be simplified.

Figure 4:
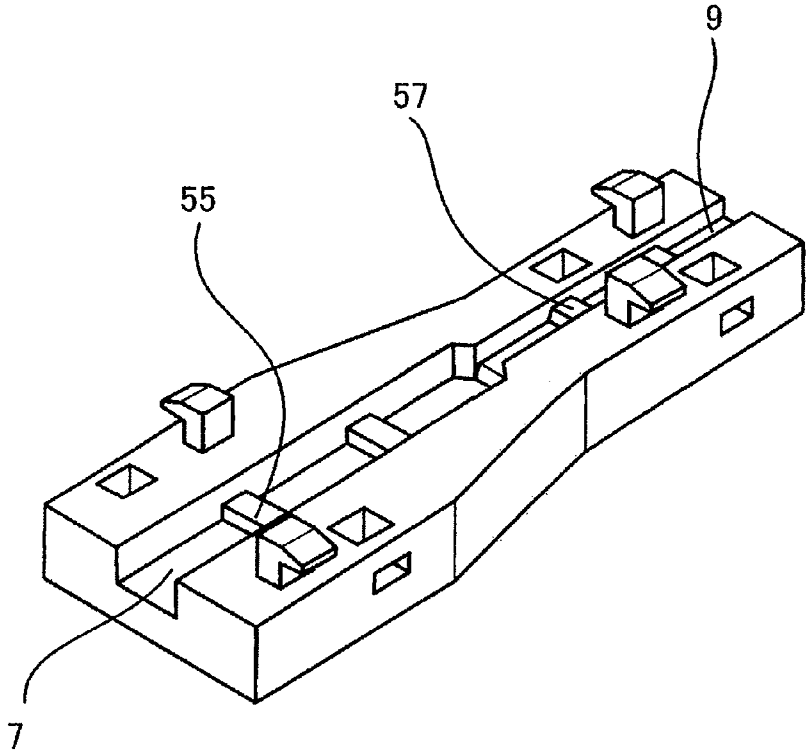
FIG. 4 is a perspective view of the lower case of the wire connection unit according to the first embodiment of the invention.
Figure 5:
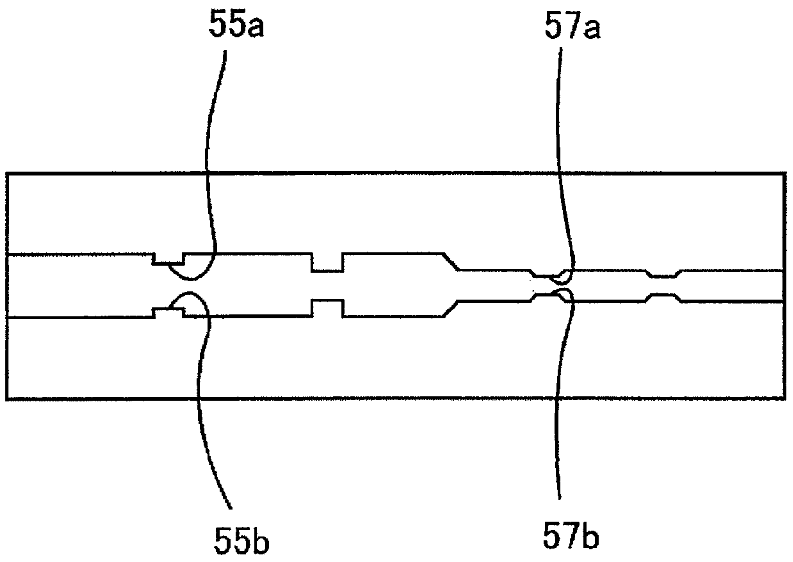
FIG. 5 is a sectional view of the wire connection unit according to the first embodiment of the invention with upper and lower cases joined together.
Figure 6:
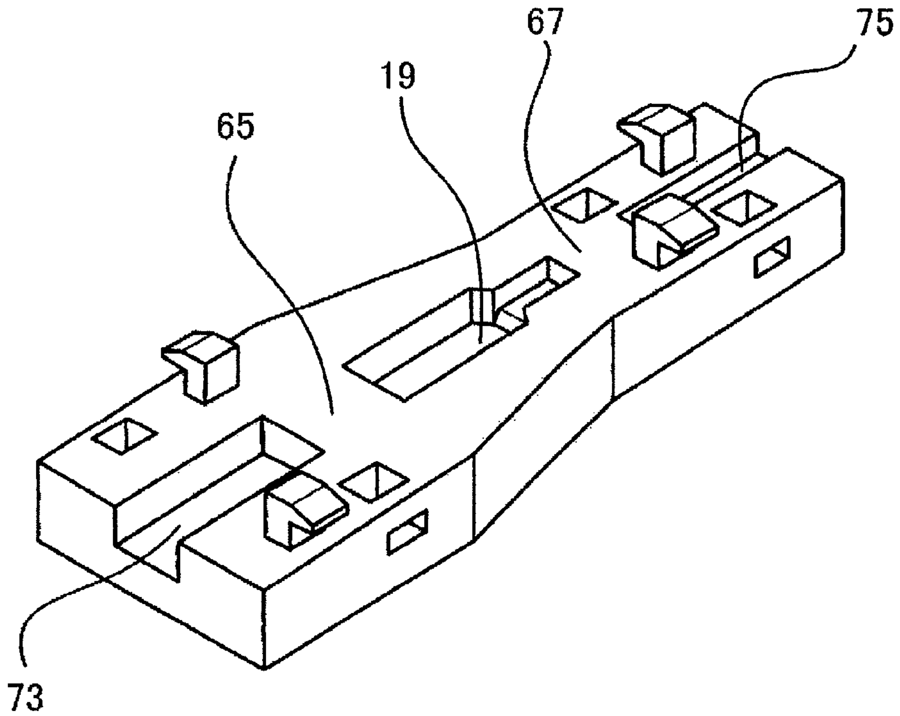
FIG. 6 is a perspective view of a lower case of a wire connection unit according to a second embodiment of the invention.
Figure 7:
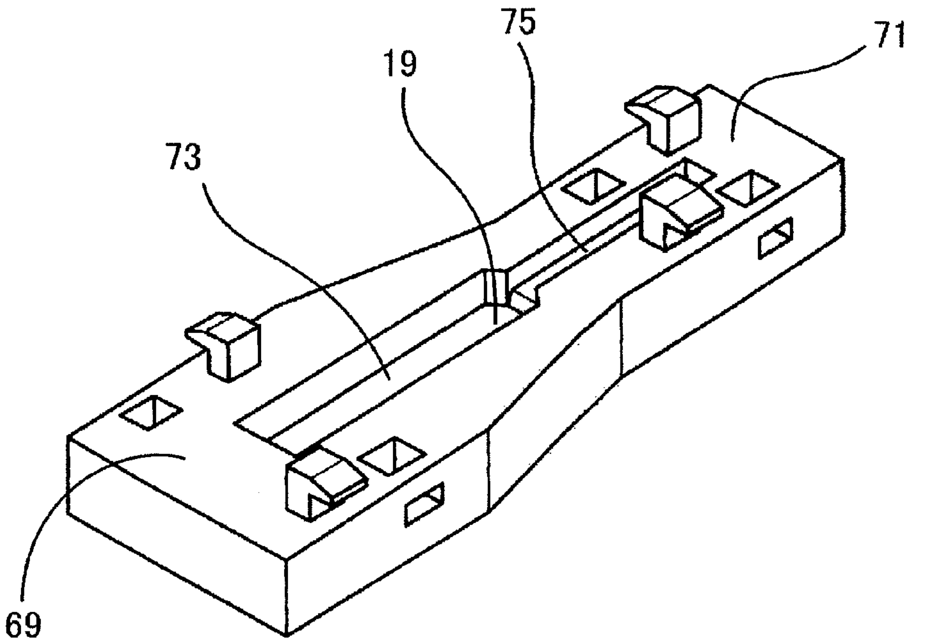
FIG. 7 is a perspective view of an upper case of the wire connection unit according to the second embodiment of the invention.

In this embodiment, while the projecting portions are described as having the substantially triangular cross-sectional shape, the invention is not limited to this example. For example, the projecting portions may each have a rectangular cross-sectional shape. FIG. 4 is a perspective view of a lower case of the wire connection unit which has projections each having a rectangular cross-sectional shape, and FIG. 5 is a sectional view of upper and lower cases having such projections which are joined together. Here, the upper case and the lower case have the same shape. As is shown in FIGS. 4, 5, in projecting portions 55, 57, in the event that distances between distal end portions of confronting projecting portions 55*a* and 55*b* and distal end portions of confronting projecting portions 57*a* and 57*b* are set to predetermined distances (for example, the distances of L1, L2), respectively, the shapes of the projecting portions 55, 57 can be set as required in accordance with a material of the covering portions of the wires. The number of projections in the groove can be set as required in accordance with a holding force required for the wire.

In this embodiment, since the shielded groove 7, the general groove 9 and the metallic connector accommodation groove 19 are divided equally in the upper and lower cases, the respective groove widths and depths of the grooves are set equal in the upper and lower cases. However, the invention is not limited to this example, and a configuration may be adopted in which the respective grooves are formed only in the lower case 3 and the upper case 1 serves as a lid. In this embodiment, while the shielded wire 31 is described as being connected with the general wire 39, the invention can also be applied to a case in which two shielded wires are connected with each other. As this occurs, braided wires of the two shielded wires may each twisted into an integral braided wire for connection with a single earth wire. Alternately, the braided wires of the two shielded wires may be connected with separate earth wires.

(Second Embodiment)

Hereinafter, a second embodiment to which the invention is applied will be described by reference to the drawings. In this embodiment, like reference numerals will be given to like constituent members to those of the first embodiment, and the description thereof will be omitted here.

The second embodiment differs from the first embodiment in that groove spaces in a shielded groove and a general wire groove which are formed when upper and lower cases are joined together are bent into a clank shape along a longitudinal direction thereof. In this embodiment, in order to form the groove spaces which are bent in the way described above, projecting portions 65, 67 on an upper case 61 and projecting portions 69, 71 on a lower case 63 are disposed so as not to come into contact with each other when the upper and lower cases are joined together, that is, the projections 65, 67 and the projections 69, 71 are disposed so that they are deviated from each other in the longitudinal direction of the groove spaces.

Figure 8:
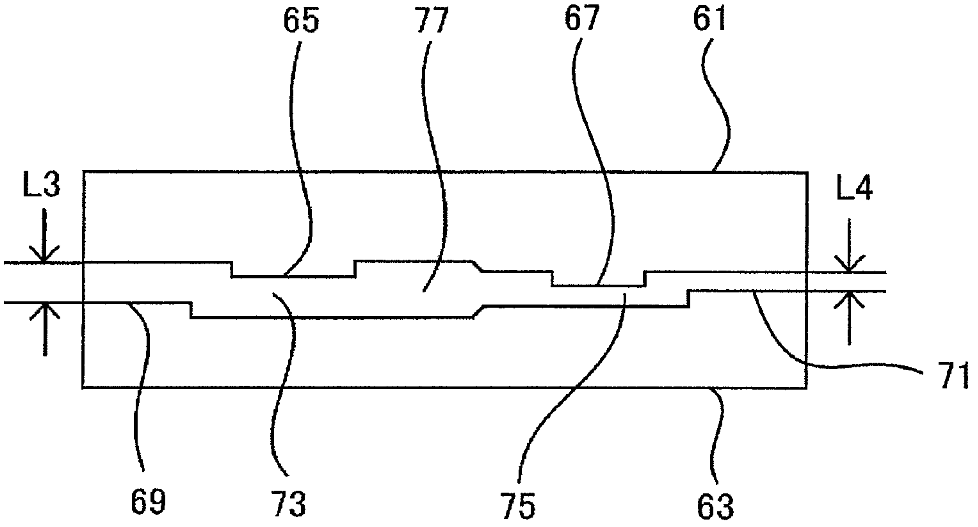
FIG. 8 is a sectional view of the wire connection unit according to the second embodiment of the invention with upper and lower cases joined together.

As is shown in FIG. 8, in a shielded wire groove 73, a bottom of a groove in the upper case 61 and the projecting portion 69 on the lower case 63 are disposed so as to confront each other, and the projecting portion 65 on the upper case 61 and a bottom of a groove in the lower case 63 are disposed so as to confront each other. In a general wire groove 75, the projecting portion 67 on the upper case 61 and a bottom of a groove in the lower case 63 are disposed so as to confront each other, and a bottom of a groove in the upper case 61 and the projecting portion 71 on the lower case 63 are disposed so as to confront each other. The shielded wire groove 73 extends while maintaining a distance L3 (FIG. 8) between the projecting portion 69 and the bottom of the groove in the upper case 61, and the general wire groove 75 extends while maintaining a distance L4 (FIG. 8) between the projecting portion 71 and the bottom of the groove in the upper case 61. Here, the distance L3 is set equal to or slightly smaller than an outside diameter of a shielded wire 31, for example, and the distance L4 is set equal to or slightly smaller than either an outside diameter of a general wire 39 or an outside diameter of an earth wire 47 which is smaller. A metallic connector accommodation groove 77 is formed between the shielded wire groove 73 and the general wire groove 75.

When the wires are assembled into the wire connection unit configured as described above, in the lower case 63, the shielded wire 31 is disposed within the shielded wire groove 73, and the general wire 39 and the earth wire 47 are disposed within the general wire groove 75. As this occurs, the individual wires are allowed to ride on the projecting portions. In this condition, when the upper case 61 and the lower case 63 are joined together, the shielded wire 31, the general wire 39 and the earth wire 47 which are accommodated within the upper and lower cases are bent to follow the shapes of the spaces of the corresponding wire grooves. Because of this, according to this embodiment, the holding force of the wires can be enhanced, and the same advantage as that of the first embodiment can be obtained.

Figure 9:
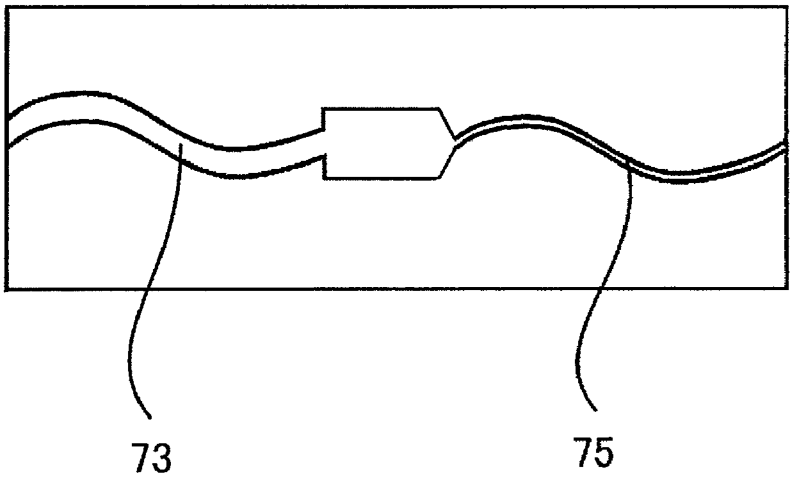
FIG. 9 is a sectional view of the wire connection unit according to the second embodiment of the invention with upper and lower cases joined together.
Figure 10:
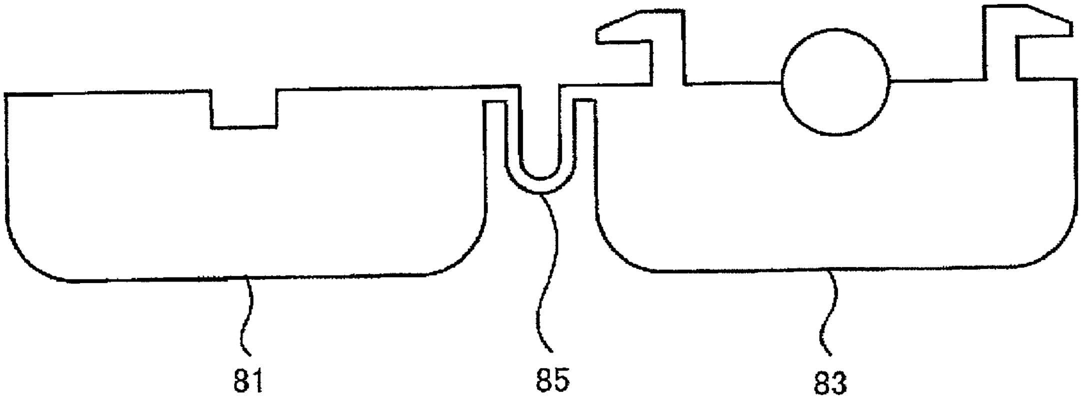
FIG. 10 is a side view showing a wire connection unit according to a third embodiment of the invention with upper and lower cases opened.

In this embodiment, while the groove spaces of the shielded wire groove 73 and the general wire groove 75 which are formed when the upper and lower cases are joined together are described as being bent into the crank shape, the invention is not limited to this example. For example, as is shown in FIG. 9, the groove spaces may be bent into a meandering shape along the longitudinal direction thereof. Even though the wire grooves have the groove spaces which so meandering, since the individual wires are accommodated while meandering to follow the shapes of the groove spaces, the holding force of the wires can be enhanced.

(Third Embodiment)

Hereinafter, a third embodiment to which the invention is applied will be described by reference to the drawing. This embodiment can be applied to the upper case and the lower case of the previous embodiments. Namely, an upper case 81 and a lower case 83 can be formed integrally by joining side edges of the upper case 81 and the lower case 83 by a resin hinge portion 85. Because of this, in the event that this embodiment is applied, the number of constituent components can be reduced.

(Fourth Embodiment)

Hereinafter, a fourth embodiment to which the invention is applied will be described by reference to the drawing. It should be understood that an upper case and a lower case have the same shape.

Figure 11:
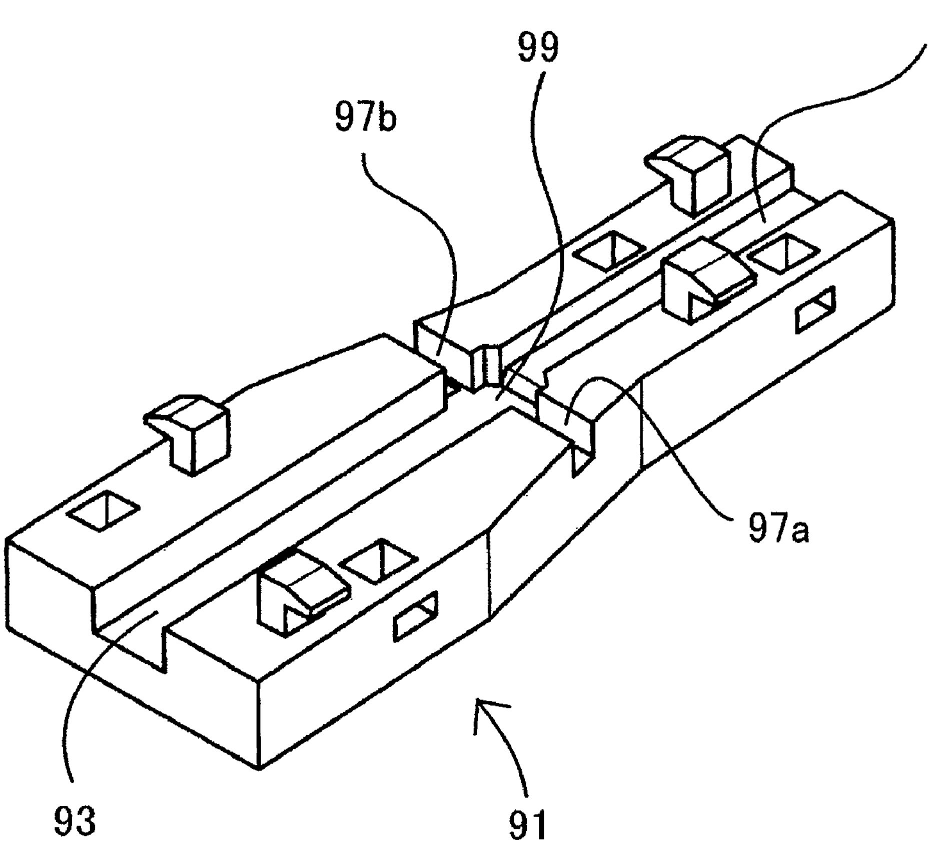
FIG. 11 is a perspective view of a lower case according to a wire connection unit of a fourth embodiment of the invention.

In this embodiment, in a lower case 91, earth grooves 97 are provided in a position where a shielded wire groove 93 and a general wire groove 95 meet so as to extend therefrom to both side faces of the lower case 91 which face each other in a width direction so that the earth grooves 97 intersect those wire grooves at right angles. A metallic connector accommodation groove 99 which accommodates a joint terminal 45 is provided before a boundary portion where the general wire groove 95 meets the earth groove 97. Here, in FIG. 11, although projecting portions formed on bottoms of the shielded wire groove 93, the general wire groove 95 and the earth groves 97 are omitted or are not shown, it should be understood that the projecting portions which are described in the previous embodiments are provided on the bottoms of the shielded wire groove 93 and the general wire groove 95 and that the projections may be or may not be provided on the bottoms of the earth grooves 97. This is because only an earth wire 47 is laid out in the earth grooves 97 and hence, there occurs a situation that no wire holding force is required.

In this embodiment, since a general wire 39 and the earth wire 47 are laid out separately in the general wire groove 95 and the earth groove 97, respectively, the joint terminal 45 is accommodated within the metallic connector accommodation groove 99, and a metallic connector 53 is accommodated within the earth groove 97. In addition, since a braided wire 35 of the shielded wire 31 is twisted into an integral portion so as to be led into either the earth groove 97*a* or the earth groove 97*b* before the joint terminal 45 where the shielded wire 31 is connected with the general wire 39, even though the joint terminal 45 is not covered with a heat-shrinkable tube, the earth wire 47 can be led out of the wire connection unit without a risk of the braided wire 35 and the metallic connector 53 being brought into contact with the joint terminal 45. When the metallic connector 53 is disposed within the earth groove 97, the metallic connector 53 is formed to a predetermined size so that the metallic connector 53 does not strike the projecting portions within the groove when the upper and lower cases are joined together, whereby the metallic connector 53 can be accommodated within the earth groove 97.

In this embodiment, since the earth grooves 97*a*, 97*b* extend from the position where they meet the shielded wire groove 93 to both the side faces of the upper and lower cases which face each other in the width direction, the earth wire 47 can be pulled out of the wire connection unit from either of the side faces of the upper and lower cases via the earth groove 97*a* or 97*b*, and a leading end of the earth wire 47 so pulled out can be connected to an earth plate (not shown), for example. Because of this, the degree of freedom in layout of the wire connection unit with respect to the earth plate can be enhanced.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The disclosures of Japanese Patent Application No. 2009-005058 filed Jan. 13, 2009 including specification, drawings and claims is incorporated herein by reference in its entirety.

What is claimed is:

1. A wire connection unit, comprising:

a connector, electrically connecting a shielded wire and a general wire, the shielded wire having a core wire shielded concentrically therearound by a braided wire;

an earth wire connector, electrically connecting an earth wire to the braided wire of the shielded wire;

a first case; and a second case, joined with the first case, and having an inner face opposing the first case, the inner face formed with:

a shielded wire groove, adapted to hold the shielded wire;

a general wire groove, adapted to hold the general wire and the earth wire in a side-by-side configuration, wherein a depth and width of the shielded wire groove are larger than a depth and width of the general wire groove; and a connector accommodation groove that accommodates the connector and the earth connector, the connector accommodation groove disposed at a boundary portion where the shielded wire groove meets the general wire groove, projecting portions protruding from a bottom of each of the shielded wire groove and the general wire groove.

2. The wire connection unit according to claim 1, wherein the first case has a same shape as the second case.

3. The wire connection unit according to claim 1, wherein the first case is connected to the second case by an elastic hinge.

4. A wire connection unit, comprising:

a connector, electrically connecting a shielded wire and a general wire, the shielded wire having a core wire shielded concentrically therearound by a braided wire;

an earth wire connector, electrically connecting an earth wire to the braided wire of the shielded wire;

a first case, having a first face; and a second case, having a second face opposing the first face, and joined with the first case;

wherein the first face and the second face form a wire path including, a first part accommodating the shielded wire, a second part accommodating the general wire and the earth wire in a side-by-side configuration, wherein a depth and width of the first part are larger than a depth and width of the second part, and a connection part disposed between the first part and the second part and accommodating the connector and the earth connector, and wherein the first part and the second part are bent respectively.

5. The wire connection unit according to claim 4, wherein the first part and the second part are bent into a meandering shape respectively.

6. The wire connection unit according to claim 4, wherein the first part and the second part are bent into a crank shape respectively.

* * * * *